United States Patent
Breitmeier

[11] 3,858,110
[45] Dec. 31, 1974

[54] METHOD AND MEANS FOR CONTINUOUS DISTRIBUTION OF ELECTRICAL ENERGY

[76] Inventor: Max Breitmeier, Oetwilerstrasse, Huttikon, Switzerland

[22] Filed: May 1, 1973

[21] Appl. No.: 356,212

[30] Foreign Application Priority Data
May 5, 1972 Switzerland.................... 6721/72

[52] U.S. Cl.................. 323/20, 307/35, 307/39
[51] Int. Cl........................ G05f 1/12, H02j 3/14
[58] Field of Search............ 307/39, 35, 31, 32, 33, 307/34, 38, 49, 11; 323/20

[56] References Cited
UNITED STATES PATENTS

| | | | |
|---|---|---|---|
| 2,784,322 | 3/1957 | Johnson | 307/39 |
| 3,240,948 | 3/1966 | Burley | 307/39 |
| 3,261,980 | 7/1966 | McCartney, Jr. et al. | 307/39 X |
| 3,423,598 | 1/1969 | Goldberg | 307/35 |
| 3,714,453 | 1/1973 | Delisle et al. | 307/39 |

Primary Examiner—Gerald Goldberg
Attorney, Agent, or Firm—Toren, McGeady and Stanger

[57] ABSTRACT

In the system disclosed, main lines feed a plurality of respective secondary lines. Each of the secondary lines is divided into two branch lines. Within each secondary line, each branch line energizes a different type of load. An output limiter connected into the first branch line limits the output of the first branch line to a predetermined maximum value. An output regulator connected into the second branch line regulates the output of the second branch line so that the total output does not drop below a predetermined minimum value in the secondary line. A voltmeter responding to the terminal voltage of the secondary line forms a control signal for the output of the regulator. In this way, if the first branch line is loaded with household appliances, and the second branch line is loaded with household heating equipment, the output of the first branch line can be kept within the predetermined maximum value and the output of the second branch line can be maintained above or at a minimum permissible terminal voltage.

10 Claims, 2 Drawing Figures

METHOD AND MEANS FOR CONTINUOUS DISTRIBUTION OF ELECTRICAL ENERGY

BACKGROUND OF THE INVENTION

This invention relates to methods and means for continuous and uninterrupted distribution of electrical energy from a main line into several secondary lines.

Increasing use of electrical appliances with high power consumption, such as electric washing machines, electric heating equipment, etc., in modern households, require optimum utilization of the existing capacities of electrical power supply systems.

The capacity of the system is generally limited by the load capacity of its lines, its transformers, and its generators. The load capacity depends upon the mean consumption by households plus safety tolerances. The load capacity cannot be too high because of the extra cost involved in supplying equipment with such high capacities.

The utilization of existing working capacity of electric power supply systems has heretofore been controlled in electric power plants either by the rates charged or by remote-control connection and disconnection of electrical appliances. In this way, a part of the operating capacity has been utilized during periods where consumption of electric power is very low, for example, at night. Excessive consumption of power during peak hours can be prevented in this way. In general, such control assures that the load capacity of the line is not exceeded. The system is built to accomodate peak demands. Thus, outside of peak hours, a great portion of the existing power supply system remains underutilized. Moreover, power control systems which operate by connecting and disconnecting circuits merely represent a discrete interruption of power consumption. This contrasts to a desired steady optimum power control.

Electric storage heaters are an example of the type of devices generally operated by remote control from an electric power plant. Such heaters are generally operated for short periods of time. By utilizing continuous power control of the charging time, the total energy could be supplied over a longer period of time and less power need be supplied over any one particular time. This would result in considerable reduction in the necessary capacity of connecting lines.

U.S. Pat. No. 3,708,684, of the same inventor as the present application, discloses an output regulator provided in each secondary line to limit the maximum value of the power through each secondary line. A central control unit sets the output regulators in response to the output of each of the secondary lines so that the sum of the power through all of the secondary lines does not exceed the load capacity of the main line.

According to that patent, each of the secondary lines is divided into two branch lines. The first branch line is loaded randomly. An output regulator in the second branch line of each secondary line responds to the energy being delivered by the first of the branch lines and limits the output of the second branch line to a value determined by the difference of the maximum energy of the secondary line and the energy actually being drained through the first branch line. Thus, the second branch line merely supplies residual energy. Specifically, the energy which is not being drawn by the first branch line but which is available from the secondary line can be taken continuously from the second branch line and applied to an energy storage device such as a heat accumulator. This makes it possible to fully utilize the working capacity of each secondary line.

Thus, the energy being drawn through each secondary line is limited continuously to a maximum value which corresponds to the load capacity of the secondary line. Such distribution of energy avoids overloading the secondary line and the main line, or the transformer. At the same time, the system is optimally balanced.

Such a system requires measurement of the output of the secondary line as well as the branch line. In addition, a central control device must limit the sum of all the outputs.

Measurement of the output of the various lines for regulating the mains is possible or expedient only under certain conditions. In general, an output load which is thermally and economically feasible for the lines and transformers may produce an undesirable voltage drop for the majority of connected loads. Yet, satisfactory operation of many electronically controlled devices, such as radios and television sets, requires maintenance of established voltage tolerance. Thus, only voltage regulators, installed in each load, which could keep even major voltage variations within admissible limits would produce a thermally and economically optical balance of the mains.

For reasons of economy, the uses of auxiliary devices for stabilizing voltage, such as a voltage regulator for each load, should be avoided. Nevertheless, the introduction of electrical heating has made optimum balancing of the mains desirable, and the distribution of energy in the mains should be such that the voltage can vary only within predetermined permissible limits.

An object of the invention is to avoid these problems.

Another object of the invention is to improve distribution systems of this type.

SUMMARY OF THE INVENTION

According to a feature of the invention, these objects are attained, in whole or in part, by having the regulator regulate the output in the secondary line so that the output voltage does not drop below a predetermined minimum terminal voltage.

According to other features of the invention, each secondary line is divided into two branches. In each secondary line, an output limiter in the first branch line limits the output of the first branch line and an output regulator in the second branch line delivers only as much power as the positive difference between a nominal and actual power in the first branch line. At the same time, the output regulator of the second branch line regulates the output for the second branch line so that the terminal voltage at the secondary line does not drop below a predetermined value determined for the sum of the two branch lines.

According to another feature of the invention, in each secondary line, the terminal voltage is compared with the predetermined minimum voltage, and not the actual current supply with the maximum admissible current supply.

The minimum voltage can be fixed, for example, by an electric power station, or it can be made time variable as a function of the time of day by means of a time switch. This way it is possible to take into account that at night, for example, when no apparatus is in operation which is susceptible to trouble, a greater voltage drop or a higher mains load can be accommodated.

While each secondary load of a network influences the voltage drop in the entire network, some lines lead to loads which have far greater effect upon the voltage drop in the entire network than others. Thus, by virtue of the invention, it is not necessary for a central control to control each individual secondary load. The central control need only supervise or control the secondary lines to those loads which affect the rest of the network greatly. Individual secondary lines which energize smaller loads, such as individual households, have little effect upon the remainder of the network so that it is unnecessary to supervise such a load from a central control unit, particularly when the load is remote from the control unit.

For this reason, the control device or control unit need merely supervise or control a limited number of secondary lines less than the total number. Each remote output regulator, which can be a voltage regulator, for example, can regulate the remote power consumption or current consumption in such a way that the voltage remains within given tolerances at each point of the network.

While with a current measurement for determining the output in a secondary line, the setting would have to be adapted to the permitted load with each variation, power increase, or extension of the network, the permitted voltage value need not be reset. If the power capacity of the network is increased, for example, more current can simply be obtained with the same permitted voltage drop. Conversely, the mains can become too weak with an increasing number of loads, and the output regulator controlled by the voltage drop in the secondary line can supply less than the necessary energy for a regenerative heating system. Complaints from inadequately supplied customers would soon make the power companies aware of an inadequate network.

According to another feature of the invention, energy control is accomplished separately for each phase of the network. That is, the individual phases are regulated independent of each other. This is possible in a regenerative heating system without creating disadvantages. Such ultimate consuming devices as electrical heating sytems make it possible to distribute the load optimally over all three phases at the same time. This helps to produce optimal balance of the network.

DESCRIPTION OF PREFERRED EMBODIMENTS

Figure 1:
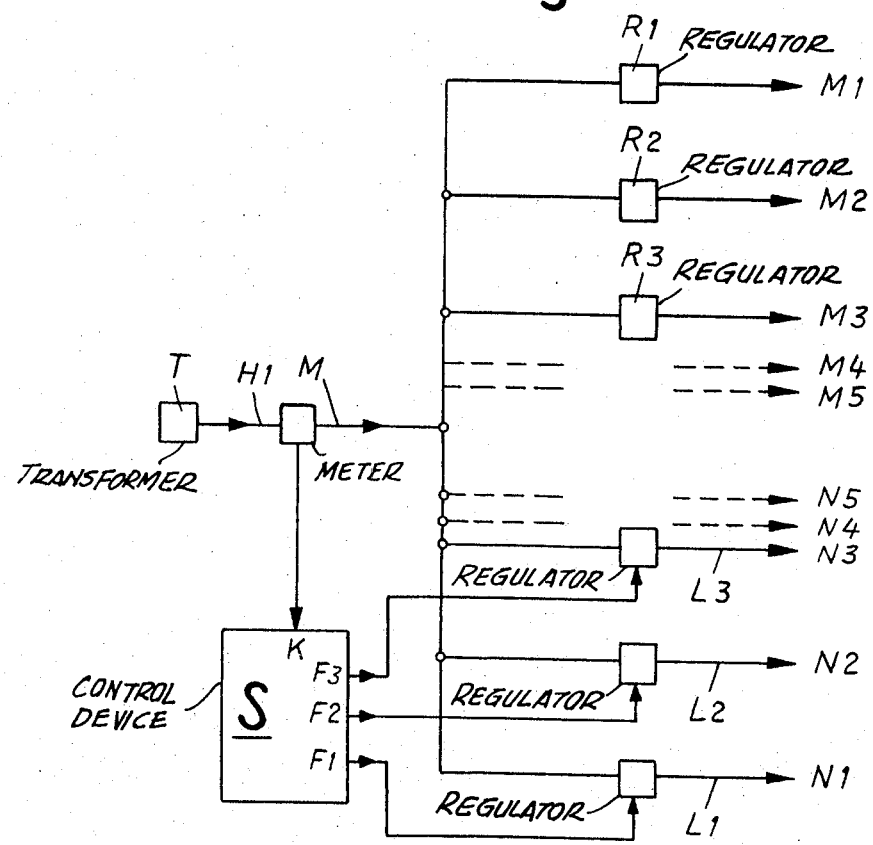
FIG. 1 is a block diagram illustrating a main line feeding a plurality of secondary lines, one group of which is locally regulated, the other group being regulated by a single control device.

In FIG. 1, a main line H1 branches into two groups of secondary lines N1 to N5 and M1 to M5. The main line originates at a transformer T. The first group of secondary lines M1 to M5 includes output regulators, such as R1 to R3 which are not connected to a central control device operated from the main line H1. The regulators R1 to R3 are connected in the first three secondary lines M1 to M3 of the first group.

Each of the secondary lines M1 to M3 feeds a load having a relatively low energy consumption level, for example, a single dwelling or individual household. Thus, the load presented to each of these secondary lines has little effect upon the rest of the system. The loads fed by the secondary lines M1 to M5 are assumed to be remotely located and relatively far away from the control device S, so that direct supervision by the control device S is not worthwhile. The local output regulators R1 to R3 regulate the individual power consumption of these secondary lines so that the voltage in each secondary line does not drop below a defined minimum value. Details of the secondary line M1 appear in FIG. 2.

In FIG. 1, output regulators L1 to L3 in the secondary lines N1 to N3 of the group of secondary lines N1 to N5 are connected to a control device S. Specifically, three outputs F1 to F3 of the control device S furnish the control signals to the output regulators L1 to L3. The secondary lines N1 to N5 supply loads whose energy consumption is comparatively great and varies to such an extent that self-regulation of the regulators L1 to L3, as in the secondary lines M1 to M5 of the first group, is not sufficient, and central supervision by the control device S is necessary.

The output regulators in all secondary lines regulate the output so that the terminal voltage in the corresponding secondary line does not drop below a defined minimum value. For this purpose, each secondary line has applied thereacross, parallel to the load, a voltmeter which charges or controls the corresponding output regulators.

According to an embodiment of the invention, the output regulator is in the form of a voltage regulator. The adjusting apparatus of the output or voltage regulators R1 to R3 for limiting the output in each secondary line is then controlled by the voltmeter such that the voltage drop in the secondary lines due to the load does not drop below the required minimum value. According to an embodiment of the invention, the output generator is in the form of a regulating transformer, such as a phase transformer, with a mechanically variable core.

A power meter or output meter M in the main line H1 determines the power output of the main line, that is, the total power output of all secondary lines. According to an embodiment of the invention, the voltage of the main line remains practically constant and the meter is a conventional inductive current transducer. The output meter M is the type that produces an output signal which is applied to an input K of the control device S.

The control device S supervises the loading of the main line H1. According to the programming of the control device, control signals are applied to the output regulators for correspondingly controlling the output of the secondary lines N1 to N5. According to one embodiment of the invention, the control device is a proportional regulator. Regulation of this second group of secondary lines N1 to N5 by means of the control device S is described in detail in the aforementioned U.S. Pat. No. 3,708,684.

Figure 2:
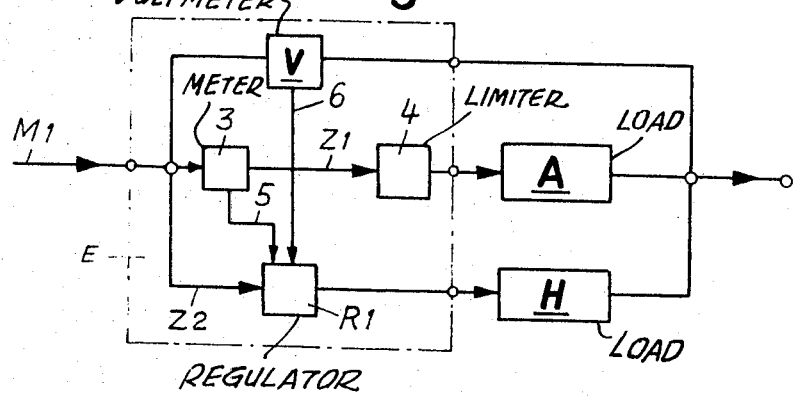
FIG. 2 is a block diagram of one of the locally regulated secondary lines.

Details of the secondary line M1 appear in FIG. 2. Here, the secondary line M1 is divided into two branch lines Z1 and Z2. The branch line Z1 applies the mains voltage to a load A, which, according to an embodiment of the invention, is composed of household appliances. An output limiter 4 ahead of the load A keeps the output of the branch line Z1 below the prescribed maximum value of the entire secondary line M1. This maximum value corresponds to the mean power consumption of the loads. The output limiter is a conventional device for regulating the load on the output branch line 21 to be below a prescribed maximum value.

A load H, in the branch line Z2, is regulated by the output regulator R1. The load H, according to an embodiment of the invention, is an electric heater. The voltmeter V measures the terminal voltage at the secondary lines M1. A line 6 feeds the output of the line M1 to the output regulator R1.

The output regulator R1 compares the actual voltage with a minimum acceptable terminal voltage. The regulator R1 releases, or delivers only enough power to the branch line Z2 so that the actual terminal voltage is not less than the minimum acceptable terminal voltage.

An output meter 3 ahead of the output limiter 4 in the branch line Z1, is, according to one embodiment of the invention a current transformer or transducer. A line 5 applies the output signal of the meter 3 to the regulator R1. If the actual terminal voltage is above the minimum value, the regulator R1 supplies only enough power to the branch line Z2 so that the power corresponds to the positive difference between the maximum acceptable power for the secondary line M1 and the actual power in the branch line Z1.

The circuit arrangement designated E in FIG. 2 is, according to an embodiment of the invention, installed whenever necessary at the input circuit of any load groups, such as households. According to an embodiment of the invention, the output regulator R1 of the arrangement E not only regulates continuously, but also starts and stops, depending upon the power conditions in the mains and depending upon the type of load, and/or switching to high or low tariff.

According to an embodiment of the invention, the second group of secondary lines have their respective output regulators in the branch line Z2 connected to an output terminal of the control device S. The latter feeds a control signal to the respective output regulator only when there is an overload of the main line H1, in order to attenuate the acceptable output in the branch line Z2 correspondingly. In this case, the acceptable output of the branch line Z2 is affected not only by the voltmeter V, and the output meter 3, but is also supervised by the control device S. However, this is necessary only when the load of such a secondary line substantially influences the rest of the mains. However, this is very rare for lines which experience normal loads such as households.

The aforedescribed methods for distributing electrical energy permit the available residual electrical energy, which is not needed by other electrical household appliances, to be fed continuously by the output regulator to an electrical regenerative heating system. According to an embodiment of the invention, this energy is stored, such as by heating a hot water reservoir, and removed again as required in the form of heat for heating rooms. The output regulator used makes sure that the terminal voltage does not drop below a predetermined mimimum voltage at any point on the lines. This minimum voltage can be fixed or can be controlled by a time circuit as a function of time so that systematic variations of the loads on the main can be considered continuously.

These means permit realization of a clean, safe, economical, and optimized electrical heating system. They balance the mains optimally without the need for new feedlines and costly apparatus.

It will be noted that the details shown in FIG. 2 for the line M1 apply equally as well for the regulators in lines M1 to M3. According to an embodiment of the invention, these details also apply to the regulators in lines N1 to N3.

While specific embodiments of the invention have been shown and described in detail to illustrate the application of the inventive principles, it will be understood that the invention may be embodied otherwise without departing from such principles.

What is claimed is:

1. A method for continuous distribution of electrical energy, which comprises distributing the electrical energy over a plurality of secondary lines each of which is divided into two branches, sensing the output voltage of each of said secondary lines and preventing the voltage in each secondary line from dropping below a defined minimum value; the steps of sensing and preventing including limiting the output power of a first of each of the two branch lines in each secondary line to less than a predetermined value, and sensing the output voltage of the second of the two branch lines in each of said secondary lines and preventing the total output of each of said secondary lines from dropping below the defined minimum value of each of the secondary lines.

2. The method as in claim 1, further comprising the step of sensing the output power of the second branch line in each of the two branch lines of each secondary line and preventing the total output power of the two branch lines in each secondary line from exceeding the predetermined maximum value.

3. The method as in claim 2, wherein the step of sensing includes metering each of the first branch lines in each of said secondary lines at a point more remote from the load of each secondary line than the point at which the output of the one of the branch lines is limited, supplying the metering signal to each of the second branch lines of each of said secondary lines with metering signal being that of the corresponding first branch lines of each secondary line, and in each secondary line and supplying an output of power of the second branch so that the output power corresponds to the difference between the maximum output for the secondary line and the actual output of the first branch lines.

4. The method as in claim 3, comprising controlling the voltage of the output in the second branch line of each secondary line by voltage regulation.

5. An apparatus for continuous distribution of electrical energy, comprising main lines, distribution means having a plurality of secondary lines having a first branch line and a second branch line, control means having a separate output regulator in each of said secondary lines for controlling said lines, each of said regulators in each of said secondary lines including limiter means in said first branch lines of said secondary line to limit the output of the first branch line to a predetermined maximum value, first meter means in said secondary line for measuring the output of said secondary line, output regulator means in the second branch line and responsive to said first meter means for regulating the output of said second branch line so that the total output of each of said secondary lines remains within a range at and above a predetermined minimum voltage.

6. An apparatus as in claim 5, wherein said regulator means in each of said secondary lines measures the output of each of said secondary lines and regulates the output of said secondary lines so that the total output of the two branch lines does not exceed the predetermined maximum value.

7. An apparatus as in claim 6, wherein said output regulators each includes second output meter means connected in each of said first branch lines at electrical positions more remote from a load than each of said limiter means, said second meter means in each of said secondary lines being coupled to the regulator means in the corresponding one of said secondary lines and controlling the regulator means so that said regulator means regulates the voltage of said second branch in each of said secondary lines so that the voltage corresponds to the difference between the predetermined maximum output for the secondary line and the actual output of the first branch line.

8. An apparatus as in claim 7, wherein said regulator means includes a voltage regulator.

9. An apparatus as in claim 6, wherein said distribution means includes a second plurality of secondary lines, a second regulator in each of said second plurality of lines, meter means responsive to the output of said main line, and a central control device responsive to said meter means for controlling said second regulators.

10. A circuit arrangement for continuous distribution of electrical energy over a plurality of secondary lines of an electrical network, comprising first and second branch lines in each of said secondary lines, in each of said secondary lines, said first branch line being connectible to a first load and said second branch line being connectible to a second load, an output limiter connected in the first branch line to limit the output of the first branch line to a predetermined maximum value, an output regulator connected into the second branch line to regulate the output of the second branch line so that the total output does not drop below a defined minimum value in the secondary line, and a voltmeter responsive to the terminal voltage of said secondary line for forming a control signal for the output regulator.

* * * * *